United States Patent
Genna et al.

(10) Patent No.: US 11,565,235 B2
(45) Date of Patent: Jan. 31, 2023

(54) SYSTEM AND METHOD FOR REMOVING CONTAMINANTS

(71) Applicant: Youngstown State University, Youngstown, OH (US)

(72) Inventors: Douglas T. Genna, Mentor, OH (US); Alissa Renee Geisse, Columbus, OH (US)

(73) Assignee: YOUNGSTOWN STATE UNIVERSITY, Youngstown, OH (US)

( * ) Notice: Subject to any disclaimer, the term of this patent is extended or adjusted under 35 U.S.C. 154(b) by 312 days.

(21) Appl. No.: 16/631,470

(22) PCT Filed: Jul. 19, 2018

(86) PCT No.: PCT/US2018/042796
§ 371 (c)(1),
(2) Date: Jan. 16, 2020

(87) PCT Pub. No.: WO2019/018591
PCT Pub. Date: Jan. 24, 2019

(65) Prior Publication Data
US 2020/0179905 A1    Jun. 11, 2020

Related U.S. Application Data

(60) Provisional application No. 62/534,263, filed on Jul. 19, 2017.

(51) Int. Cl.
*B01J 20/22* (2006.01)
*B01J 20/02* (2006.01)
(Continued)

(52) U.S. Cl.
CPC ......... *B01J 20/226* (2013.01); *B01J 20/0211* (2013.01); *C02F 1/285* (2013.01);
(Continued)

(58) Field of Classification Search
None
See application file for complete search history.

(56) References Cited

U.S. PATENT DOCUMENTS

2012/0251438 A1    10/2012   Trukhan et al.

FOREIGN PATENT DOCUMENTS

| CN | 102249363 A | * | 11/2011 |
| CN | 102249363 A | | 11/2011 |
| CN | 102949980 A | | 3/2013 |

OTHER PUBLICATIONS

Machine translation of CN Patent# 102249363A, pp. 1-7. (Year: 2011).*

(Continued)

*Primary Examiner* — Clare M Perrin
(74) *Attorney, Agent, or Firm* — Fay Sharpe LLP

(57) ABSTRACT

A heterogeneous material (e.g., a metal-organic framework or "MOF") is useful for removing heavy metals from a liquid (e.g., water). The heterogeneous material may incorporate a group 16-containing heterocycle supported on solid media. Thiophene-containing MOFs, such as ATF-1 and DUT-67, may be used to remove lead from water. It is postulated that the metal is adsorbed via non-covalent interactions. The systems and methods described herein may also be applicable to other heavy metals. Thus, the applications are not limited to drinking water purification. Instead, the systems and methods may be used for a broad variety of other applications, such as nuclear waste remediation.

20 Claims, 6 Drawing Sheets

(51) Int. Cl.
*C02F 1/68* (2006.01)
*C02F 1/28* (2006.01)
*C07F 3/06* (2006.01)
*C07F 7/00* (2006.01)
C02F 101/20 (2006.01)
C07F 1/08 (2006.01)

(52) U.S. Cl.
CPC ............... *C02F 1/683* (2013.01); *C07F 3/06* (2013.01); *C07F 7/00* (2013.01); *C02F 2101/20* (2013.01); *C07F 1/08* (2013.01)

(56) References Cited

OTHER PUBLICATIONS

Earl et al. (Inorganic Chemistry, 2013, 52, 10021-10030). (Year: 2013).*
Barakat et al. (Arabian Journal of Chemistry, 2010, 4, 361-377). (Year: 2010).*
Mihaly et al., "Ion-Directed Synthesis of Indium-Derived 2,5-Thiophenedicarboxylate Metal-Organic Frameworks: Tuning Framework Dimensionality", Jan. 12, 2016, Crystal Growth & Design; vol. 30, Issue 3, pp. 1550-1558; abstract; p. 1551, figure 2, scheme 1.
Eddaoudi et al., "Porous Metal-Organic Polyhedra: 25 A Cuboctahedron Constructed from 12 Cu2(C02)4 Paddle-Wheel Building Blocks", May 9, 2001, Journal of the American Chemical Society; vol. 123, Issue 18, pp. 4368-4369; p. 4368, first column, last paragraph; p. 4368, second column, first paragraph; p. 4369, figure 1.
Zhang et al, "Homochiral Crystallization of Microporous Framework Materials from Achiral Precursors by Chiral Catalysis", Oct. 1, 2008, Journal of the American Chemical Society; vol. 130, Issue 39, pp. 12882-12883; abstract; p. 2, fifth paragraph.
Yang et al., "Fluorous Metal—Organic Frameworks with Superior Adsorption and Hydrophobic Properties toward Oil Spill Cleanup and Hydrocarbon Storage", J. Am. Chem. Soc., 2011, 133, 18094-18097), Year: 2011.
Abney et al., "Metal Organic Framework Templated Inorganic Sorbents for Rapid and Efficient Extraction of Heavy Metals", Advanced Materials, vol. 26, Oct. 27, 2014, pp. 7993-7997.
Werker et al., Two Anhydrous Salts of TetrafJuoroterephthalic Acid (H2tF-BDC): K2tF-BDC and Rb2tF-BDC, Zeitschrift fur anorganische und allgemeine Chemie, vol. 639, No. 14, Oct. 25, 2013, pp. 2487-2492.
Benedikt Dolfus et al., "[Li2(tF-BDC)(DMF)2]: A New Alkali Metal Salt of TetrafJuoroterephthalic Acid (H2tF-BDC)", Z. Anorg. Allg. Chem., vol. 640, No. 7, Feb. 12, 2014, pp. 1235-1238.

* cited by examiner

A

B

C

SYSTEM AND METHOD FOR REMOVING CONTAMINANTS

This application is a National Stage Entry of International Application No. PCT/US2018/042796, filed Jul. 19, 2018 and titled "SYSTEM AND METHOD FOR REMOVING CONTAMINANTS"; which claims the benefit of U.S. Application No. 62/534,263, filed Jul. 19, 2017 and titled "SYSTEM AND METHOD FOR REMOVING HEAVY METALS", both of which are incorporated by reference herein.

BACKGROUND

The present disclosure relates to metal organic frameworks. Methods for making the frameworks and methods for removing contaminants from water using the frameworks are also disclosed.

Non-limiting examples of contaminants include heavy metals, drugs (e.g., pharmaceuticals), perfluorinated organics, and polycyclic aromatic hydrocarbons.

Clean water is a fundamental requirement for human existence. Industrialization, advances in energy production, and an aging infrastructure have led to the build-up of heavy metals in a variety of water sources including: drinking, waste, and natural water bodies. The effects of contaminated water on human and animal populations, ecosystems, and global climate are increasingly dangerous. This emerging issue has been targeted as an area of importance by both private and government funding agencies alike. Specifically the DOE report "Basic Research Needs for Environmental Management" highlights the necessity of developing new technologies for removing cationic heavy metals such as actinium and cesium from waste streams as part of ongoing efforts to purify legacy radioactive material. Key challenges were highlighted such as developing "materials for chelation, ion exchange, and other separation methods." In addition to nuclear waste metals, recent tragedies such as the events in Flint, Mich. have reminded the nation about the dire consequences of chronic exposure to lead. Cadmium, mercury, strontium, palladium, and tin are additional non-limiting examples of metals that should be removed from drinking water and/or are present in liquid nuclear waste.

According to the World Health Organization, pharmaceutical contamination of drinking water is an emerging problem. By some estimates, almost 25% of the world's rivers and lakes are contaminated. Although current contaminant levels are generally below therapeutic thresholds, the effects of prolonged exposure at low dosages are unknown. Pharmaceutical contamination could potentially affect aquatic life in addition to humans.

Some drugs (e.g., tetracycline, ciprofloxacin, and 17α-ethynylestradiol) are not easily degraded via conventional water treatment methods. For example, reverse osmosis and membrane filtration may not remove parts per million (ppm) levels of contaminants. The European Union recently finished the Enzymatic Decontamination Technology (ENDE-Tech) project. This $3.5 million project aimed at developing a commercial technology for the enzymatic degradation of waste pharmaceuticals but did not deliver a commercial product.

In addition to pharmaceuticals, other contaminants (e.g., polycyclic aromatic hydrocarbons) may be present in water. The contaminants may result from incomplete combustion, industrial effluents, and chemical spills such as the Deepwater Horizon incident. Chronic exposure to polycyclic aromatic hydrocarbons has been linked to carcinogenesis and developmental disorders in humans.

Common water treatment techniques (traditionally designed for parasite and microbe removal) such as the activated sludge process are capable of removing some of these contaminants from water streams. However, batch and site disparities in sludge quality are notorious and have led to mixed results in water purification. Furthermore, approaches such as the activated sludge method, although feasible on a plant scale, may not be feasible for deployment to individual users in the field or during site specific catastrophic events.

A more practical alternative would be a non-biologic based alternative that is more reproducible over multiple theaters of deployment. It would be desirable to develop new systems and methods for decontaminating water.

BRIEF DESCRIPTION

The present disclosure relates to systems and methods for removing contaminants from water.

Disclosed, in some embodiments, is a method for treating a liquid containing at least one heavy metal contaminant. The method comprises: contacting the liquid with a metal organic framework. The metal organic framework comprises: a secondary building unit comprising a metal; and an electron-rich linker comprising at least one Group 16-containing heterocycle.

The method may be a batch process or a continuous process.

In some embodiments, the Group 16-containing heterocycle comprises a thiophene.

The linker may comprise at least two thiophene moieties.

In some embodiments, the linker comprises at least three thiophene moieties.

The linker may comprise four thiophene moieties.

In some embodiments, the linker comprises a fused terthiophene.

The linker may comprise a bisthiophenefuran.

In some embodiments, the metal organic framework further comprises: an electron-poor linker comprising an electron-poor moiety.

The electron-poor linker may be selected from the group consisting of tetrafluoroterephthalic acid and 1,4-dicarboxytetrazine.

In some embodiments, the metal organic framework further comprises: a second electron-rich linker comprising at least one Group 16-containing heterocycle; wherein the first electron-rich linker and the second electron-rich linker are different.

The first electron-rich linker and the second electron-rich linker may have the same topicity.

In some embodiments, the first electron-rich linker and the second electron-rich linker have different topicities.

The metal organic framework may further comprise: an electron-neutral linker.

In some embodiments, the at least one heavy metal contaminant is lead.

The secondary building unit may comprise at least one of zinc, zirconium, copper, and indium.

In some embodiments, the secondary building unit comprises at least one of a $Cu_2$-paddlewheel, $Zr_6O_4$, $In(CO_2R)_4$, $Zn_3(CO_2R)_8$, and $Zn_4O$.

Disclosed, in other embodiments, is a method for treating a liquid containing at least one heavy metal contaminant. The method comprises: contacting the liquid with a metal organic framework. The metal organic framework comprises: a secondary building unit comprising a metal; and an electron-rich linker selected from the group consisting of:

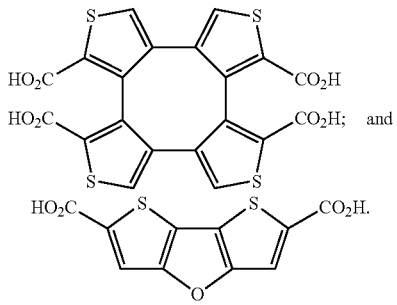

In some embodiments, the electron-rich linker is

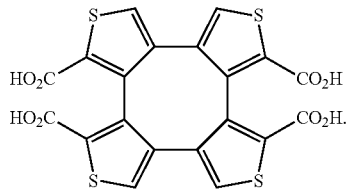 [SMILES: O=C(O)c1scc2c1-c1c(csc1C(=O)O)-c1csc(C(=O)O)c1-c1c-2csc1C(=O)O]

The electron-rich linker may be

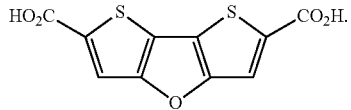

Disclosed, in further embodiments, is a metal organic framework comprising: a secondary building unit; and a linker selected from the group consisting of:

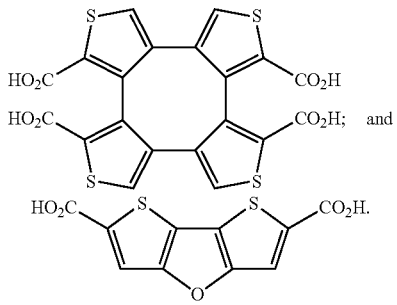

BRIEF DESCRIPTION OF THE DRAWINGS

FIG. 9A illustrates the synthesis of YCM-27 with DMF molecules removed for clarity. FIG. 9B illustrates a side-view of YCM-27 with DMF molecules removed for clarity. FIG. 9C illustrates a single 3-Zn cluster.

DETAILED DESCRIPTION

Figure 1:
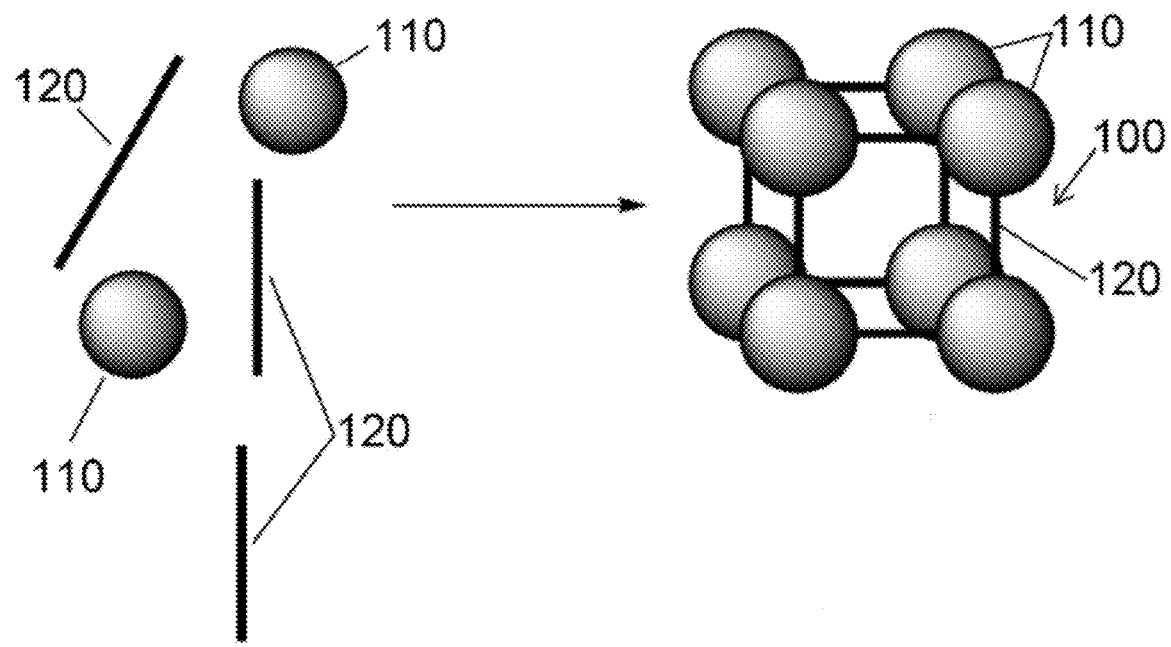
FIG. 1 illustrates the formation of a metal organic framework in accordance with some embodiments of the present disclosure.

A more complete understanding of the devices and methods disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function. In the following specification and the claims which follow, reference will be made to a number of terms, which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints.

For the recitation of numeric ranges herein, each intervening number there between with the same degree of precision is explicitly contemplated.

Metal organic frameworks are materials in which metal-to-organic ligand interactions yield coordination networks. The frameworks include metal-containing secondary building units and organic linkers. The metal-containing secondary building units may consist of single metal ions or may be clusters that include metals and other elements. The secondary building unit may also be referred to as an inorganic node.

FIG. 1 illustrates a metal organic framework 100 in accordance with some embodiments of the present disclosure. The metal organic framework 100 includes secondary building units 110 and linkers 120.

Figure 2:
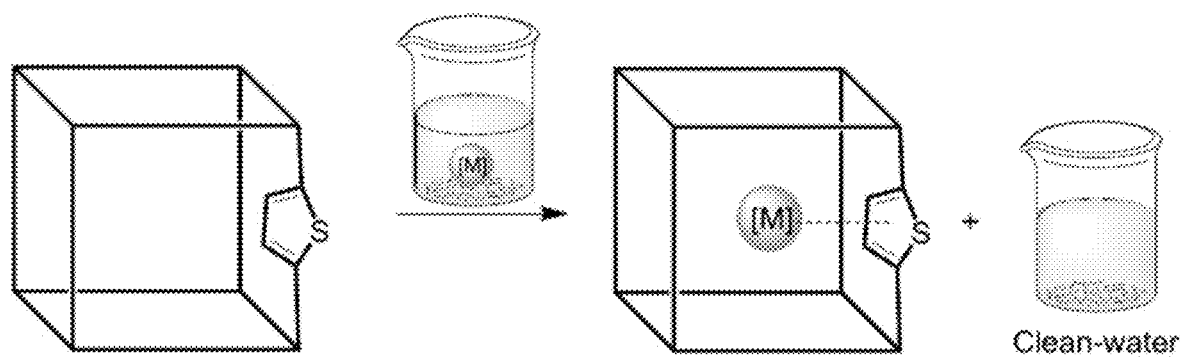
FIG. 2 illustrates a decontamination method in accordance with some embodiments of the present disclosure.

FIG. 2 illustrates the removal of metals from an aqueous solution using a metal organic framework. The removal utilizes metal-π chelation. In particular, a thiophene-containing metal organic framework is introduced to an aqueous solution containing a metal. The chelation yields clean water upon removal of the metal organic framework.

In some embodiments, the systems and methods of the present disclosure are useful for heavy metal remediation of aqueous solutions by implementing selectively designed porous metal organic frameworks (MOFs). MOFs are 3-dimensional porous coordination polymers derived from an inorganic repeating unit (referred to as a node or secondary building unit (SBU)) and an organic repeating unit (referred to as a linker). These materials are ideal candidates for metal waste disposal since their large void volumes allow for increased storage capacity and their heterogeneous nature enables potentially recyclable deployment in both batch and flow purification systems.

In some embodiments, the MOFs take advantage of π-basic thiophene rings embedded in the framework. Thiophene-containing MOFs have been identified due to the ability of thiophene to form stronger π-complexes with 4d and 5d metals than carbon-only arenes (e.g. benzene, cyclopentadienylide). Preliminary data demonstrates that two MOFs synthesized using the linker 2,5-thiophenedicarboxylic acid, ATF-1 (In-node) and DUT-67 (Zr-node), can remove $Pb^{2+}$ ions from aqueous solution at 189 mg/g and 63 mg/g respectively.

Current state-of-the-art technologies such as chemical treatment and biological degradation can be expensive, be difficult to implement, and generate more (potentially toxic) waste. Physico-chemical treatment (e.g. adsorption, mass transfer) is an attractive alternative as it has the potential to be waste neutral. Since most often the sorbent is heterogeneous, the contaminated water can be purified via passive or active filtration over the solid sorbent. To this end, the deployment of select water-stable thiophene-containing MOFs for sorption of heavy-metal cations from aqueous media via discrete cation-π interactions may be useful. This contribution is significant because it is expected to enhance the ability to remove heavy metals from water, leading to healthier populations and reclamation of lost environmental infrastructures. Ready access to clean water will improve communities surrounding nuclear facilities such as the Oak Ridge Reservation in East Tennessee and the Savannah River site in South Carolina. Populations with severe lead contamination such as those in Flint, Mich. will benefit as lead pipe removal is non-trivial and alternate strategies for water purification are needed. In addition to providing clean water, metal-adsorption can lead to heavy metal reclamation. This is especially significant as the mining of precious metals becomes increasingly hazardous both to humans and the environment. Indirect benefits include advances in MOF synthesis strategies (both solvothermal and post-synthetic modifications). As new frameworks are synthesized additional applications such as small molecule adsorption and catalysis can be envisioned and exploited.

MOFs are ideal adsorbents, as data demonstrates their ability to adsorb metals from water. Additionally, due to large internal surface areas, MOFs are able to increase storage capacity when compared with standard containers. In addition to cleaning the 330 million liters of known waste stored at nuclear waste facilities, the surrounding environment (e.g., ground water and soil) are often contaminated with radioactive material that must be remediated. The same filtering principles that are expected to remediate the high level waste (HLW) can also remediate contaminated water and soil extracts, allowing for MOFs to be deployed for both applications.

Figure 3:
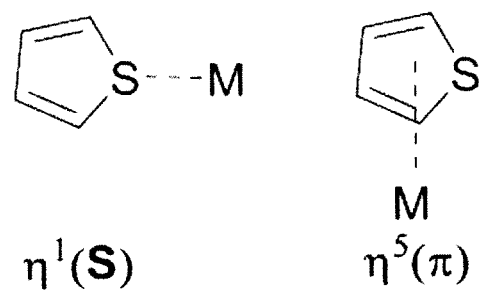
FIG. 3 illustrates metal-binding motifs of thiophene.

Thiophene and its derivatives can bind metals/cations in several ways, however the $\eta1(S)$ and $\eta5(\pi)$ motif are most common and are shown in FIG. 3. Notably thiophenes form strong η5 binding interactions with 2nd and 3rd row metals due to the low lying LUMO of the thiophene, which facilitates a strong back-bonding interaction from metals with 4d and 5d electrons. This back-bonding interaction is most striking when compared to other 6π-electron aromatic ligands such as cyclopentadienylide ($Cp^{-1}$), which is a stronger donor than thiophene but has weaker acceptor interactions due to a higher energy LUMO. To this end, several η5-thiophene organometallic complexes include Ru, Os, Rh, and Cr.

The binding of non-transition metals such as Sr, and Pb has been demonstrated with thiophene-containing macromolecules; however, the nature of the bonding interaction between the metal and thiophene is unclear. Although cationic alkali and alkali earth metals such as $Sr^{2+}$ and $Cs^+$ are d0, and thus should only bind weakly with thiophene, the d-electrons in the sub-valence (or closed shell) are available for potential back-bonding, which can explain the strong interactions. In silico binding experiments of thiophene with Hg, however, demonstrate a clear S-centered Hg-π interaction.

The MOFs of the present disclosure may rely on either having a functional group pendent to the linker capable of ligating the metal or implementing an anionic framework that forms an anion-cation pair with the heavy metal.

In some embodiments, the MOFs are selected from anionic In-derived MOF ATF-1 and neutral Zr-derived DUT-67.

In some embodiments, the MOFs are selected from MOF-107, MOF-110, $Zn_3(tdc)_4$, UMCM-3, ATF-1, DUT-67, and DUT-69. Five of these frameworks contain three of the four most well studied SBU's ($Zn_4O$, $Cu_2$-paddlewheel, and $Zr_6O_4$). The $Cr_3O$ SBU, common in the MIL-101 series, has no known parent framework with TDC as the organic linker.

MOF-107 and MOF-110 are derived from a Cu-paddle wheel SBU and have an augmented square lattice and Kagome-like topologies respectively. Comparing heavy metal adsorption with MOF-107 and MOF-110 is expected to provide insight on the importance of topology without having to deconvolute metal effects. Likewise DUT-67 and DUT-69 will allow for a similar comparison without such a severe change in architecture as they form the reo and bct net topologies respectively. These two frameworks share a common topological origin as they are related to the classic fcu topology found in UiO-66. UMCM-3, although a mixed linker MOF, has been targeted due to its large pores and use of the classic $Zn_4O$ octahedral SBU. Anionic frameworks ATF-1 and $Zn_3(tdc)_4$ have similar distorted diamond and square-like topologies, which are also isostructural with MOF-107. Negatively charged MOFs encapsulate endogenous cations, traditionally ammonium cations, during the synthesis process rendering a globally charge neutral material. By implementing an anionic framework containing a thiophene moiety, sorption of the heavy metal can be synergistically accomplished with both the cation-π interaction of the thiophene ring and charge balancing electrostatics between the metal and the framework. This is in contrast to the anionic frameworks, which implement electrostatics as the only form of heavy metal binding. In the systems and methods of the present disclosure, electrostatics can be treated as a complementary interaction not the sole mechanism of action. ATF-1 can adsorb large amounts of lead under aqueous conditions albeit with some loss of phase purity in the presence of high concentration solutions (0.1M).

In order for a MOF to be deployed as a long-term water filter, long-term stability profiles need to be established (weeks, months, years) for all MOFs studied. Of the targeted frameworks only DUT-67 and DUT-69 have reported stability profiles, 24 hours in deionized water and 3 days in concentrated HCl. Additionally, preliminary data for Pb adsorption of DUT-67 demonstrated that the framework was stable after being soaked in 0.1M solution of $Pb(NO_3)_2$ or $Pb(OAc)_2$ for one week. These data are consistent with the high stability traditionally associated with the $Zr_6O_4$ SBU. Although the hydrothermal stability of MOFs has been correlated to several factors, including the M-O bond dissociation energy, full analysis of each framework must be undertaken as such correlations are not fully predictive.

The framework may be an In-derived and/or a Zn-derived framework.

In some embodiments, the Zn-derived framework is named YCM-27. This new charge neutral framework has an infinite chain SBU in which trimeric zinc clusters are linked by bridging TDC ligands. Each cluster has three chemically unique Zn metal species containing a mix of μ1 and μ2 and κ1 and κ2 carboxylates along with three coordinated DMF molecules. Removal of these DMF molecules reveal a framework with accessible pore windows of 7.5 Å×7.2 Å.

Metals that may be removed using the MOFs of the present disclosure include Ag, Cd, Ce, Cs, Eu, La, Pd, Ni, Fe, Na, Rh, Ru, Se, Sr, Y, Zr, Cr, Zn, Al, and Cu. For water remediation, the MOF doesn't have to be selective for a particular metal; however, for metal reclamation the MOF should be selective. The decision to use 0.1M solutions of Pb was made to assay the MOFs for competency and to determine maximum uptake. Since heavy metals exist in the environment at ppm and ppb levels, those concentrations will also be tested, once ideal frameworks are identified. Adsorption experiments will be quantified using ICP-MS and UVvis spectroscopy. The materials post adsorption will be thoroughly characterized via powder X-ray diffraction (PXRD), solid-state IR, Raman, and energy-dispersive X-ray spectroscopies (EDS), along with ICP-MS and NMR of the digested material to ensure material stability. Lastly, single-crystal X-ray diffraction of the MOFs post metal adsorption will be taken in an effort to directly identify the metal binding interaction.

Non-selective materials are ideal for en masse purification of water or HLW, while selective adsorbents are designed for retrieval of a particular metal allowing for precious metal reclamation. All frameworks capable of heavy-metal adsorption will be tested under both batch and flow conditions and will be screened for metal release and sorbent recyclability.

Heavy metals do not generally exist as "free" cations in solution. They are associated with counter anions, which in environmental aqueous systems are often $CO_3^{2-}$, $AcO^-$, and $NO_3^-$. These anions need to be accounted for in any heavy metal remediation technology. In embodiments wherein the systems and methods involve noncovalent, non-ionic interactions with the heavy metal, it can be inferred that the anion is being adsorbed along with the metal. The bulkiness of the counter anion and along with the charge balancing nature could stand to weaken the metal-framework interaction. If the anion could be independently stabilized, then the adsorbed metal can be expected to bind more tightly to the thiophene moiety, yielding better sorption properties. The thiophene functional group may serve both functions: as a metal sorbent via cation-π interactions, and as an anion sorbent via chalcogen bonding.

Chalcogen bonds form from the coordination of a Lewis base with a 'σ-hole' of sulfur, selenium, or tellurium, but not oxygen. The σ-hole is the antibonding σ* orbital of the corresponding chalcogen bonding interaction. Interaction of the incoming Lewis base forms ~180° from the collinear covalent bond. The size of the σ-hole and thus the strength of the chalcogen bond is proportional to the size of the chalcogen with tellurium presenting the strongest interaction.

Synthesizing MOFs with multiple thiophene moieties per linkage may result in an increase in heavy metal adsorption and cooperative anion-binding. Increasing the number of thiophenes per SBU may increase the number of heavy metal binding sites with only minimal increase in molecular weight of the framework (as the majority of the framework weight lies in the SBU). For example, DUT-67 has a theoretical Pb adsorption maximum (assuming one Pb ion per thiophene) of 553 mg/g MOF. A DUT-67 analog with 2,5'-bis-alkynylthiophenedicarboxylate (BisTDC), has theoretical maximum of 970 mg/g MOF.

In some embodiments, the linker includes $H_2BisTDC$:

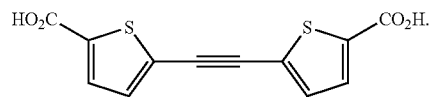

$H_2BisTDC$ linker can be synthesized by iterative Sonogashira coupling of 2-iodo-5-carboxythiophene and TMS-acetylene. The unprotected carboxyl group may be detrimental to the desired coupling reaction, to prevent Cu-mediated decarboxylation and other decomposition pathways, the carboxylic acid can be protected as the corresponding alkyl ester, which has been tolerated in Sonogashira couplings. Additionally the 5-position of thiophene can be substituted with other functional groups, including 4-carboxyphenyl, 4-carboxy-2,3,5,6-tetrafluorophenyl, and 5-carboxythiophenyl. The bis-thiophenyl moiety has been targeted to aide in the sequestration of not just the heavy metal, but also its counter anion. It has been documented that bischalcogen containing heterocycles of the BisTDC-type are competent at forming chalcogen-anion interactions. The anion can donate its electrons into both vacant sigma-holes of the chalcogen leading to a stabilization effect. The ability to both separately participate in cation-π and chalcogen bonding would lead to a powerful synergism with the potential for increased heavy metal uptake. By stabilizing the anion, the linker can participate in stronger cation-π interactions due to the 'nakedness' of the coordinating cation. Additionally, this linker series can be synthesized with Se and Te in lieu of S, increasing the strength of the chalcogen-anion interaction.

In some embodiments, the linker includes BTTDC:

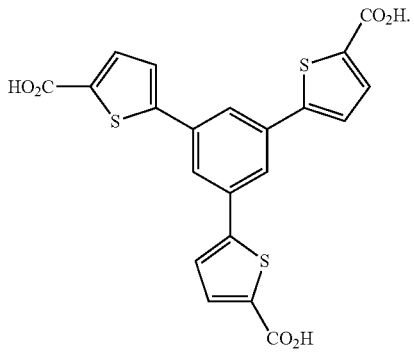 [SMILES: O=C(O)c1ccc(-c2cc(-c3ccc(C(=O)O)s3)cc(-c3ccc(C(=O)O)s3)c2)s1]

Suzuki-coupling of 1,3,5-tribromo benzene with 3 equiv. of 2-carboxythiophene-5-boronic acid can yield the $H_3BTTDC$ ligand. MOF synthesis involving BTTDC may be performed. Additionally, due to the use of tritopic linkers in mixed-linker systems, BTTDC can be substituted for btb in UMCM-152 and UMCM-3 type architectures.

In some embodiments, the metal organic framework is designated YCM-210. YCM-210 may be formed by reacting BTTDC with zirconium (IV) chloride.

In some embodiments, the linker includes $H_4TTDC$:

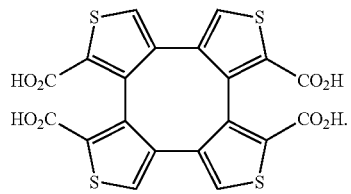 [SMILES: O=C(O)c1scc2c1-c1c(csc1C(=O)O)-c1csc(C(=O)O)c1-c1c-2csc1C(=O)O]

A method for forming the linker may include quenching the tetraanion with $CO_2$ or a $CO_2^-$ synthon (e.g. ethylchloroformate). Due to the ipsilateral pattern of $H_4TTDC$, this linker may self-assemble similarly to 1,2,4,5-tetracarboxybenzene or 1,2,4,5-tetra(4-carboxyphenyl)benzene under solvothermal conditions.

In some embodiments, the linker includes at least one ter-chalco-arene. The ter-chalco-arene may be selected from:

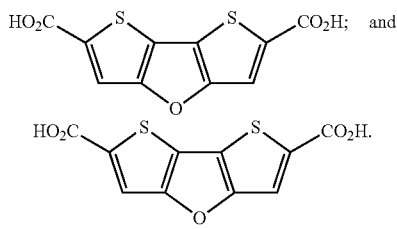

Synthesis of this Zr framework and development of novel complementary frameworks using Cu, Zn, and In nodes will be followed by metal sorption studies. The accessibility of the mono-furan analog may allow for interrogation of the role of the electronics of the fused central heteroarene without having to change the architecture of the framework.

A complementary approach to synthesizing thiophene-only type MOF systems is to embed the chalocogen-containing ring in the linker of a stable structure. Zeolitic imidazolate frameworks (ZIFs) and zeolite-like metal organic frameworks (ZMOFs) exhibit high stability profiles and diverse architectures, much like their aluminosilicate namesakes. Specifically ZIF-8 can survive boiling water for at least 7 days, while the anionic rho-ZMOF can survive $EtOH:H_2O$ solutions for several days at room temperature. ZIFs and ZMOFs are derived from imidazoles and 4,5-dicarboxyimidazoles respectively and have been synthesized using In, Zn, and Cu SBUs. If the 2-position of the imidazole heterocycle were substituted with a functionally relevant sorbent (e.g. thiophene), one could build a robust framework that is easily and highly tunable. The substituted imidazole dicarboxylates can be easily synthesized from tartaric acid, fuming nitric acid, and the appropriate aldehyde. Many 2-substituted imidazoles are commercially available, and many are easily synthesized via one pot procedure from the corresponding nitrile. The 2-phenyl- and 2-thiophenyl-4,5-imidazoledicarboxylic acids have already been synthesized and preliminary PXRD data indicate that the respective ZMOF can be synthesized. This approach is expected to rapidly develop a functionally diverse library of frameworks.

Potential drawbacks of the ZIF and ZMOF approach are pore clogging due to the protrusion of the arene into the pore aperture and inhibition of self-assembly all together. Both of these problems can be solved by synthesizing a MOF with a mixture of both non-functionalized and functionalized imidazoles. This can be accomplished either through direct solvothermal synthesis or through post-synthetic ligand exchange.

The synthesis of mixed-linker MOFs or porous coordination copolymers can be achieved by simultaneously subjecting two different organic linkers to traditional solvothermal MOF synthesis conditions. Most often the linkers involved are topologically distinct (e.g. ditopic and tritopic) but contain identical coordination modalities ($CO_2^-$). Synthesis of these frameworks allows for rapid diversification and population of a given MOF library from readily available linkages.

Figure 4:
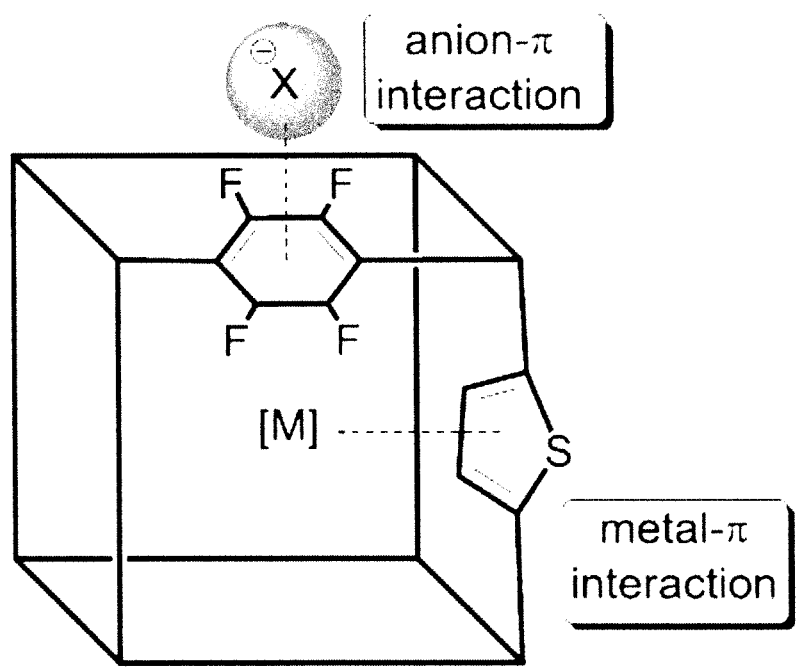
FIG. 4 illustrates a metal organic framework with an electron poor linker and an electron rich linker.

Synthesizing thiophene-containing mixed linker MOFs will allow access to at least the following types of structures:

1) MOFs with both electron-rich and electron-poor moieties. FIG. 4 illustrates one example. By implementing an electron poor linkage (e.g. tetrafluoroterephthalic acid or 1,4 dicarboxytetrazine) as a co-linkage with a thiophene-containing linker, frameworks that can synergistically bind both metal cations and their counter anions (via anion-π interactions) can be synthesized.

Figure 5:
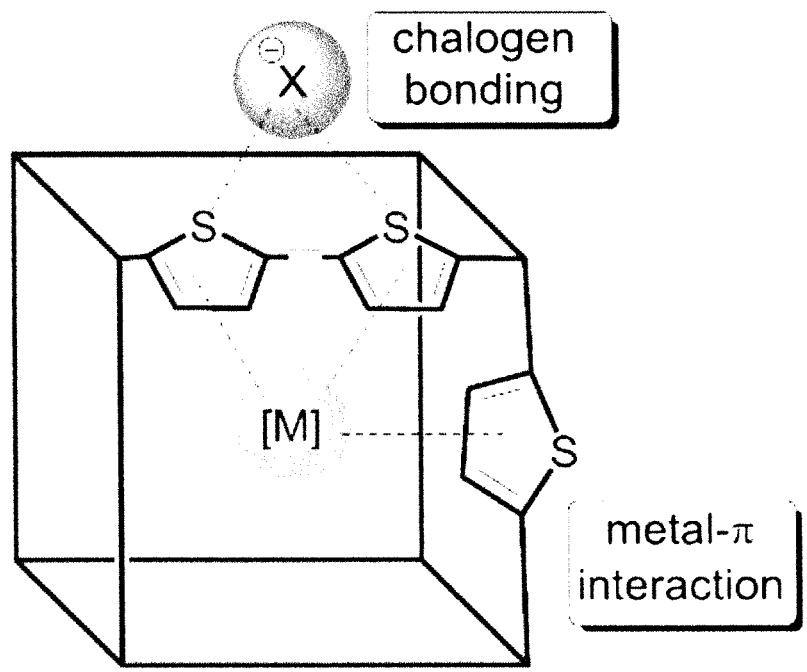
FIG. 5 illustrates a metal organic framework with two different thiophene-containing linkers.

2) MOFs with multiple types of thiophene linkages. FIG. 5 illustrates one example. Incorporation of multiple thiophene containing linkages with the same or different topicities (e.g. $H_2TDC$ and $H_3BTTDC$) will expand on the structural complexity of known thiophene containing frameworks without sacrificing total thiophene content. These architectures may allow for more binding sites per molecular mass.

Figure 6:
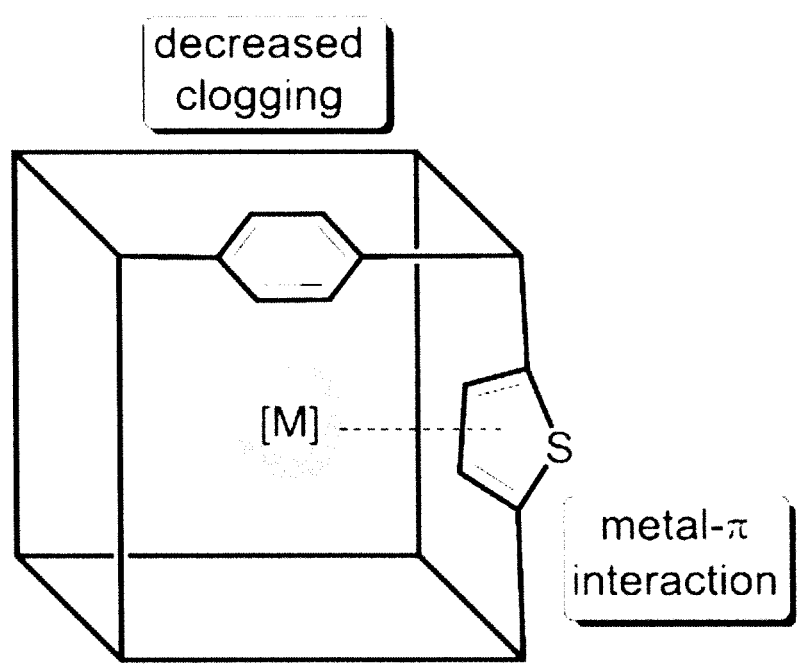
FIG. 6 illustrates a metal organic framework with thiophene-containing and electron 'neutral' linkers.

3) MOFs with electron rich thiophenes and electron neutral linkages. FIG. 6 illustrates one example. Frameworks synthesized with this electronic configuration are expected to be free from potential problems such as pore-clogging.

All three of the MOF architectures outlined above are expected to be accessible by either direct solvothermal copolymerization or via solvent assisted ligand exchange (SALE). Synthesis may be achieved under solvothermal conditions. The copolymerization of a mixed linker system, in which the linkers are electronically similar, may be facilitated by controlling the stoichiometric ratio of the coordinating groups. For example, an appropriate ratio to grow UMCM-1 of terephthalic acid (ditopic) and btb (tritopic) may be 1.3:1. The tritopic linker has 33% more metal binding sites, and therefore one can add 33% less equivalents to have equal mole fractions of metal binding moieties.

Mixed linker-MOFs may be challenging to synthesize due to the discrepancy in the electronics of the two linkers. The electron-deficient arene will be less nucleophilic and less likely to participate in self-assembly than the electron-rich thiophene-containing linker. This could be overcome during solvothermal synthesis by increasing the stoichiometry of the electron deficient linker beyond the typical equal equivalence of metal-binding sites traditionally employed in mixed linker systems (e.g. 10:1 electron deficient linker to thiophene containing). An alternative strategy would be to sequentially add the two linkers. For example, one could incubate the metal and the electron deficient ligand for a set period of time ~24 hours under traditional solvothermal conditions. Then, add a hot solution of the electron rich linker and allow the system to incubate further. This strategy is expected to allow the electron deficient component to actually bind to the forming SBU instead of just slowing down the kinetics of the electron rich linker.

SALE represents a complementary approach to solvothermal copolymerization of mixed ligand frameworks. This technique can be implemented to synthesize the mixed-linker motifs discussed above. Notably, it is expected to be useful in accessing multiple architectures made from the identical mixed linker and SBU system. For example, by treating UiO-66 with $H_2TDC$ under SALE conditions, one could access a MOF with both terephthalic acid and TDC with the fcu topology or the fully thiophenylated UiO-66 analog. Although accessing the fully exchanged motif is unlikely, the partially exchanged framework (even in limited amounts) is still attractive and is expected to have significant potential for metal adsorption. Partial exchange of the linkers in DUT-67 with terephthalic acid will access a MOF with the same chemical composition of the partially exchanged UiO-66 derivative, but with reo topology. SALEs is expected to be successful in synthesizing mixed-linker MOFs. UMCM-3 can be treated with a solution of H3BTTDC to yield an isostructual framework.

In some embodiments, treating ZMOF-1 with 2-thiophenyl- and 2-pentafluorphenyl-4,5-dicarboxyimidazole both individually and together (e.g., sequentially) will yield mixed-linker MOFs.

The following examples are provided to illustrate the systems and methods of the present disclosure. The examples are merely illustrative and are not intended to limit the disclosure to the materials, conditions, or process parameters set forth therein.

EXAMPLES

Example 1

Suspension of ATF-1 and DUT-67 frameworks in a 0.1M aqueous solution of $Pb(NO_3)_2$ for 3 days followed by inductively coupled plasma mass spectrometry (ICP-MS) analysis of the solution revealed that ATF-1 adsorbed 189 mg/g and DUT-67 had adsorbed 67 mg/g of Pb respectively. When UiO-66 (derived from terephthalic acid and $Zr_6O_4$) was suspended in the same $Pb(NO_3)_2$ solution, no detectable amount of Pb was adsorbed. UiO-66 and DUT-67 are structurally similar and have related topologies with a key difference being the presence of the thiophene moiety versus the benzene moiety. This result intimates the importance of the thiophene functional group for metal uptake.

Example 2

Figure 7:
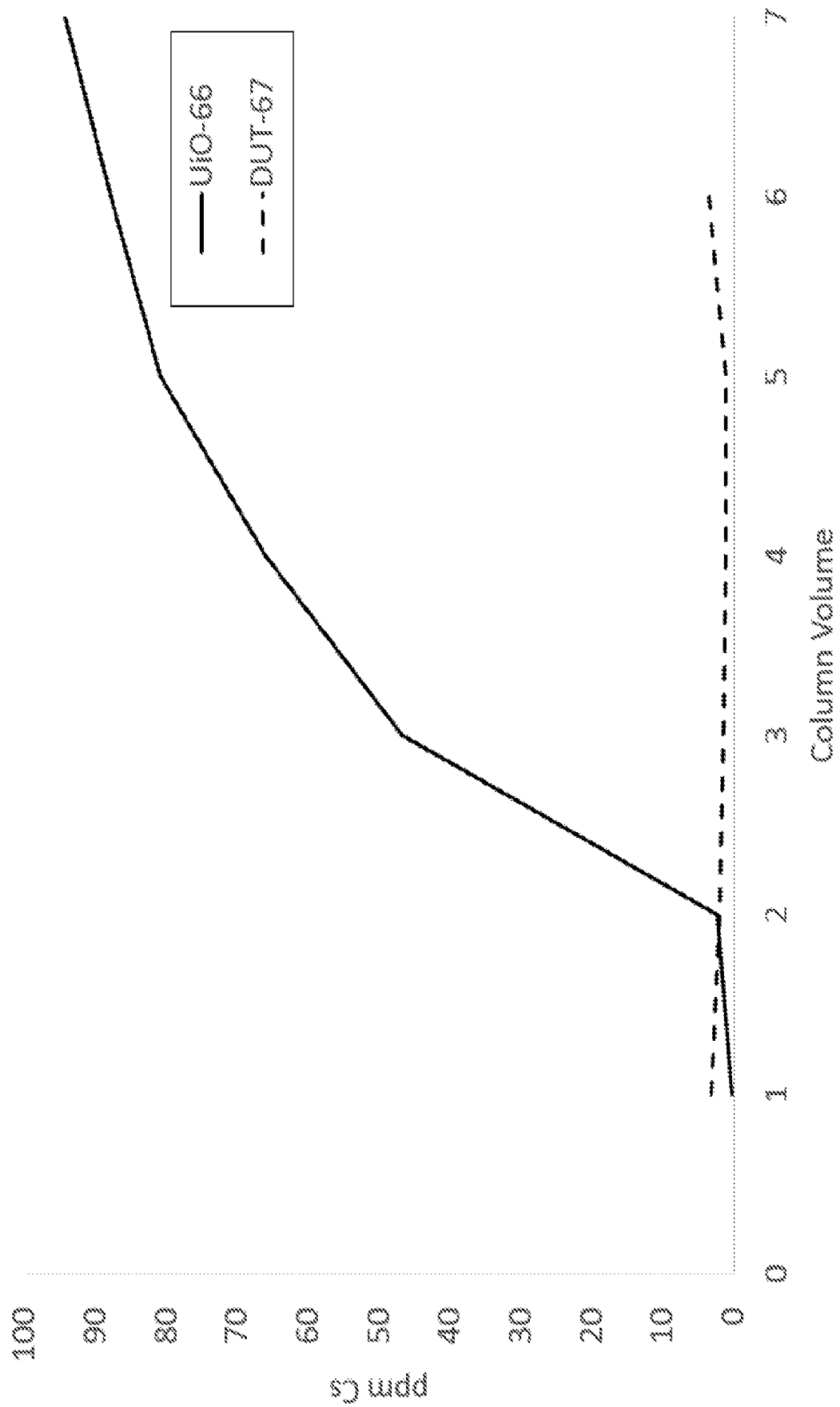
FIG. 7 is a graph comparing Cs uptake by the UiO-66 and DUT-67 metal organic frameworks.

$Cs^+$ loading in DUT-67 and UiO-66 was determined by flowing a 100 μm aqueous solution of $Cs_2CO_3$ through a 1 in stainless steel column (¼ OD), packed with 250 mg of the requisite MOF, using a Waters 515 hplc pump at a flow rate of 0.5 mL/min. Prior to use, each MOF was activated by heating to 100° C. under high vacuum (<1 torr). Each column volume was fractionated and aliquots were taken of each column volume (1 mL), diluted, and analyzed using inductively coupled plasma mass spectrometry (ICP-MS). FIG. 7 illustrates the results.

Example 3

Figure 8:
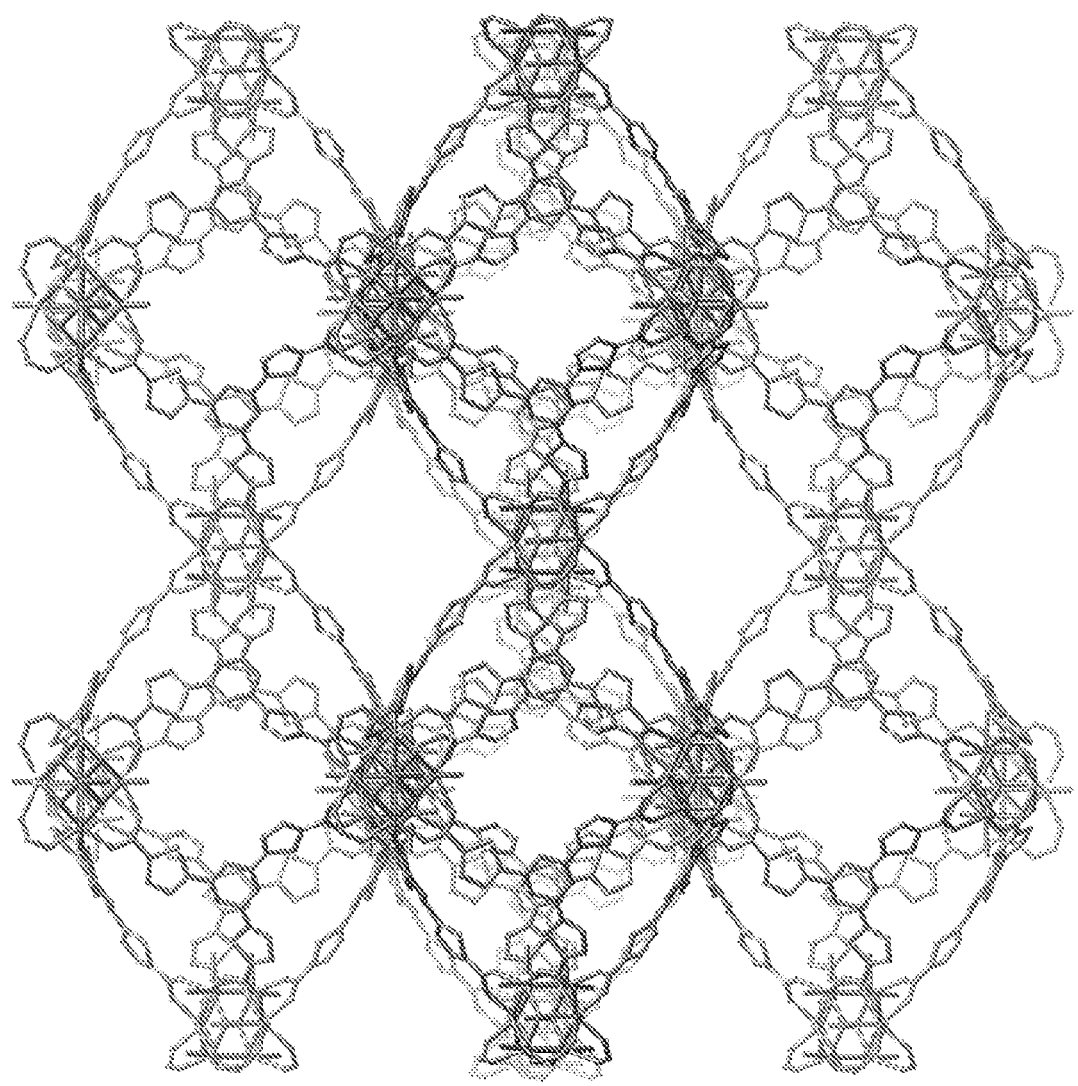
FIG. 8 illustrates the YCM-210 metal organic framework.

A new metal organic framework was synthesized by reacting $H_3BTTDC$ with $ZrCl_4$. The framework was named YCM-210. The framework is illustrated in FIG. 8. YCM-210 forms a MOF containing the $Zr_6O_4$ cluster commonly found in UiO-66 and DUT-67. There are eight linkers per $Zr_6O_4$ cluster making the SBU $Zr_6O_4L_6$, which is isostructual to DUT-67. In a 20 mL scintillation vial charged with DMF (3 mL) and formic acid (2 mL) was added $ZrCl_4$ (18 mg, 0.077 mmol). The solution was sonicated for 10 minutes and then $H_3BTTDC$ (10 mg, 0.021 mmol) was added and the solution was sonicated for an additional 10 minutes. The vial was sealed with a Teflon-lined cap and placed in a 120° C. oven for 48 hours. At this time the vial was removed from the oven and allowed to cool to room temperature. The contents of the vial was analyzed using single-crystal X-ray diffraction.

Example 4

Figure 9:
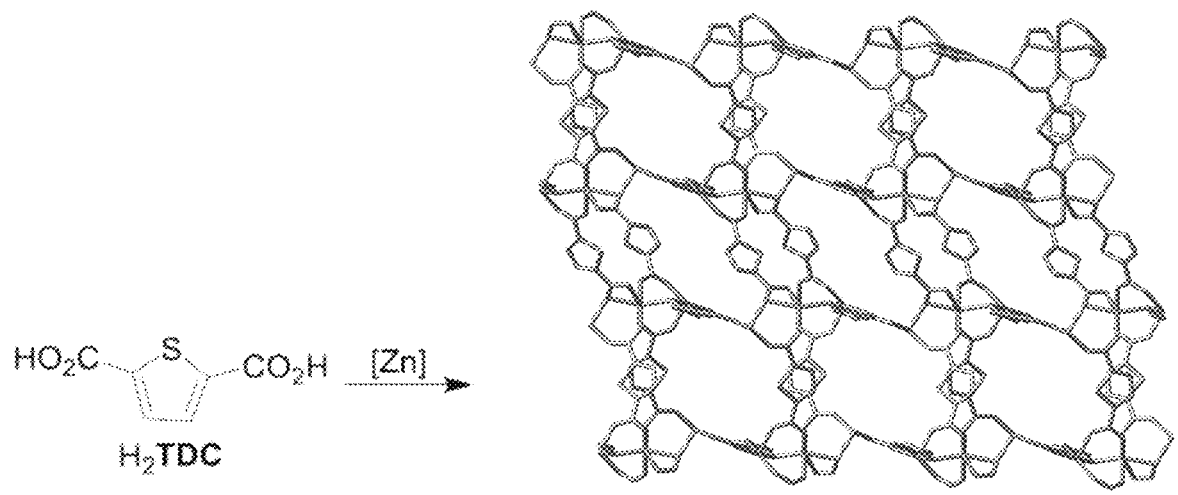
FIG. 9 illustrates the YCM-27 metal organic framework.
Figure 9:
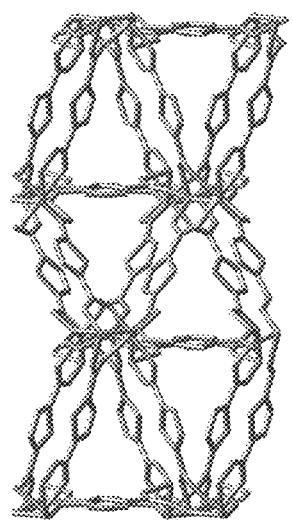
Figure 9:
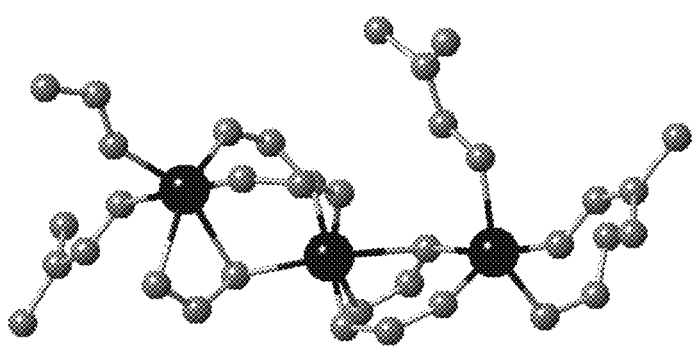

Another new metal organic framework (YCM-27) was synthesized. In a 150 mL Erlenmeyer flask charged with 2,5-thiophendicarboxylic acid (84 mg, 0.49 mmol) and tetrafluoroterephthalic acid (116 mg, 0.49 mmol)) in 37.5 mL 1:1 DMF:EtOH was added a solution of $Zn(NO_3)_2$ $(H_2O)_6$ (349 mg, 1.17 mmol) in 37.5 mL 1:1 DMF:EtOH. The combined solution was filtered through a GE 25 mm PVDF syringe filter (0.45 μm) in 6 mL portions into 20 mL scintillation vials. The scintillation vials were sealed with Teflon-lined caps and heated to 100° C. for 24 hrs. At this time the vials were removed from the oven and allowed to cool to room temperature. The contents of each vial were combined and crystals were analyzed using single-crystal X-ray diffraction. FIG. 9 includes different views of YCM-27. FIG. 9 illustrates the YCM-27 metal organic framework. FIG. 9A illustrates the synthesis of YCM-27 with DMF molecules removed for clarity. FIG. 9B illustrates a sideview of YCM-27 with DMF molecules removed for clarity. FIG. 9C illustrates a single 3-Zn cluster.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for treating a liquid containing at least one heavy metal contaminant, the method comprising:
    contacting the liquid with a metal organic framework;
    wherein the metal organic framework comprises:
        a secondary building unit comprising a metal; and
        an electron-rich linker selected from the group consisting of:

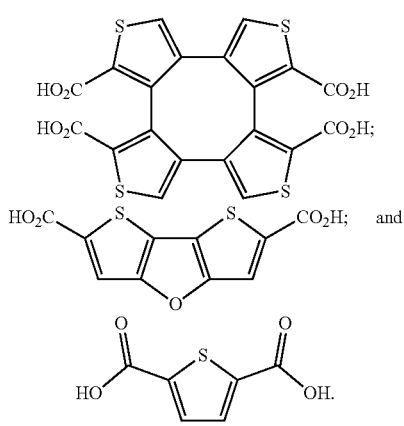

2. The method of claim 1, wherein the metal organic framework further comprises:
    an electron-poor linker comprising an electron-poor moiety.

3. The method of claim 2, wherein the electron-poor linker is selected from the group consisting of tetrafluoroterephthalic acid and 1,4-dicarboxytetrazine.

4. The method of claim 1, wherein the metal organic framework further comprises:
    a second electron-rich linker comprising at least one Group 16-containing heterocycle;
    wherein the first electron-rich linker and the second electron-rich linker are different.

5. The method of claim 4, wherein the first electron-rich linker and the second electron-rich linker have the same topicity.

6. The method of claim 4, wherein the first electron-rich linker and the second electron-rich linker have different topicities.

7. The method of claim 1, wherein the metal organic framework further comprises:
    an electron-neutral linker.

8. The method of claim 1, wherein the at least one heavy metal contaminant is lead.

9. The method of claim 1, wherein the secondary building unit comprises at least one of zinc, zirconium, copper, and indium.

10. The method of claim 1, wherein the secondary building unit comprises at least one of a $Cu_2$-paddlewheel, $Zr_6O_4$, $In(CO_2R)_4$, $Zn_3(CO_2R)_8$, and $Zn_4O$.

11. The method of claim 1, wherein the electron-rich linker is

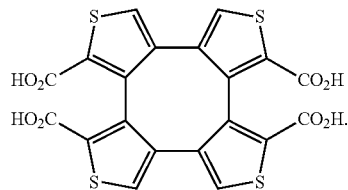 [SMILES: O=C(O)c1scc2c1-c1c(csc1C(=O)O)-c1csc(C(=O)O)c1-c1c-2csc1C(=O)O]

12. The method of claim 1, wherein the electron-rich linker is

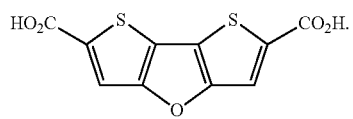 [SMILES: O=C(O)c1cc2oc3cc(C(=O)O)sc3c2s1]

13. The method of claim 1, wherein the electron-rich linker is

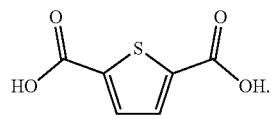

14. The method of claim 1, wherein the secondary building unit comprises $Zr_6O_4$.

15. The method of claim 1, wherein the secondary building unit comprises zirconium.

16. The method of claim 1, wherein the secondary building unit comprises a trimeric zinc cluster.

17. The method of claim 1, wherein the secondary building unit comprises a trimeric zinc cluster and wherein the electron-rich linker comprises 2,5-thiophenedicarboxylic acid.

18. The method of claim 1, wherein the secondary building unit comprises $Zr_6O_4$ and wherein the electron-rich linker comprises 2,5-thiophenedicarboxylic acid.

19. A method for treating a liquid containing at least one heavy metal contaminant, the method comprising:
    contacting the liquid with a metal organic framework;
    wherein the metal organic framework comprises:
        a secondary building unit comprising $Zr_6O_4$; and
        a thiophene-containing electron-rich linker.

20. A method for treating a liquid containing at least one heavy metal contaminant, the method comprising:
   contacting the liquid with a metal organic framework;
   wherein the metal organic framework comprises:
      a secondary building unit comprising $Zr_6O_4$; and
      a thiophene-containing electron-rich linker comprising:
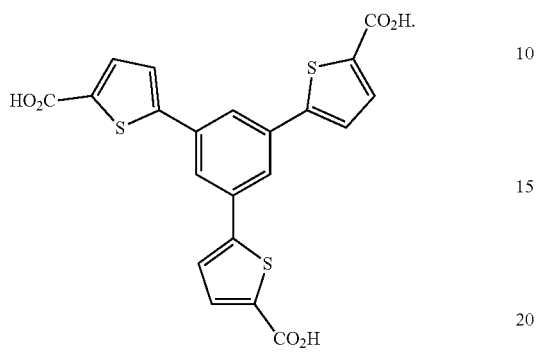
* * * * *